United States Patent

Yokomichi et al.

[11] Patent Number: 5,204,196
[45] Date of Patent: Apr. 20, 1993

[54] SOLID STATE AND CONDUCTIVE POLYMER COMPOSITION

[75] Inventors: Yasunori Yokomichi, Osaka; Shinichi Tada, Ikoma; Hitoshi Nishino, Kawachinagano; Kenji Seki, Higashiosaka, all of Japan

[73] Assignee: Osaka Gas Company Limited, Japan

[21] Appl. No.: 841,055

[22] Filed: Feb. 25, 1992

[30] Foreign Application Priority Data

Feb. 25, 1991 [JP] Japan .................. 3-115700

[51] Int. Cl.$^5$ .............. H01M 6/18; H01M 4/36; H01M 10/36
[52] U.S. Cl. ................. 429/192; 252/62.2; 528/61; 524/394
[58] Field of Search ......... 524/394, 415, 423, 429, 524/236; 429/192; 528/61; 252/62.2

[56] References Cited

U.S. PATENT DOCUMENTS 5,061,581 10/1991 Narang et al. .............. 429/192

FOREIGN PATENT DOCUMENTS 2442513 7/1980 France .

Primary Examiner—Paul R. Michl
Assistant Examiner—Tae H. Yoon
Attorney, Agent, or Firm—Larson and Taylor

[57] ABSTRACT

A solid state and conductive polymer composition comprising a host copolymer shown in the general formula:

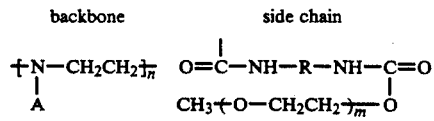

wherein n is an integer in the range of 3 to $1 \times 10^{-7}$, m is an integer in the range of 3 to 100, R is $-C_6H_3(CH_3)-$ or $-(CH_2)_l-$ (l is an integer in the range of 1 to 10), A is hydrogen atom or side chain and the mole fraction of PEO units in the host copolymer is not less than 5% and a supporting electrolyte containing at least one of salts consisting of alkali metal salt, alkaline earth metal salt, ammonium salt, transition matal salt and a solid acid, a supporting electrolyte being admixed in an amount in the range of 0.1 to 400 parts by weight per 100 parts by weight of the host copolymer.

1 Claim, No Drawings

SOLID STATE AND CONDUCTIVE POLYMER COMPOSITION

FIELD OF THE INVENTION

The present invention relates to a solid state and conductive polymer composition used for battery, electrochromic device, condenser, sensor and the like.

BACKGROUND OF THE INVENTION

Solid electrolytes containing host polymers produced by adding poly(ethylene oxide) (side chain) to poly(ethylenimine) (backbone) as well as generally used liquid electrolytes are proposed as a electrochemical element used for battery, electrochromic device, condenser, sensor and the like (see Japanese Unexamined Patent Publication No. 63-136409).

The solid electrolytes are capable of solving problems derived from liquid electrolytes, such as undermining of reliability due to leakage of liquid and the difficulty of treating electrolyte in the process of processing and production. However, ionic conductivity of the solid electrolytes is not enough.

The object of the invention is to provide a solid state and conductive polymer composition having high ion conductivity.

The present inventors have conducted extensive research considering the above-mentioned problems of prior art and found that the compositions exerting the desired effect can be obtained by using poly(ethylenimine) as a backbone and combining an oligo- or poly(ethylene oxide) side chain with the backbone via a joining group having diurethane structure.

The invention relates to a solid state and conductive polymer composition comprising a host copolymer shown in the general formula:

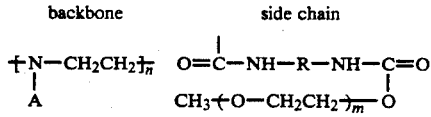

wherein n is an integer in the range of 3 to $1 \times 10^7$, m is an integer in the range of 3 to 100, R is $-C_6H_3(CH_3)-$ or $-(CH_2)_l-$ (l is an integer in the range of 1 to 10), A is hydrogen atom or side chain and the mole fraction of PEO units in the copolymer is not less than 5% and a supporting electrolyte containing at least one of acids or salts consisting of alkali metal salt, alkaline earth metal salt, ammonium salt and transition-metal salt, a supporting electrolyte being admixed in an amount in the range of 0.1 to 400 parts by weight per 100 parts by weight of the host copolymer.

In the specification, "solid state" means both solid material and paste-like material.

Known poly(ethylenimine)s are widely used as a backbone of the host copolymer of the invention, for example, straight-chain and highly crystallizable poly(ethylenimine) synthesized from 2-oxazolines can be used. The molecular weight of poly(ethylenimine) used is preferably in the range of 500 to 10000.

Known poly(ethylene oxide)s (hereinafter referred to as "PEO") are widely used as a side chain of the host copolymer used in the invention, the polymerization degrees of PEO chain used being 3 to 100. When the PEO is monomer or dimer, obtained film is hard, and ionic conductivity of the film become undermined. When the PEO is more than 100 of polymerization degree, film shape is good, however, ionic conductivity of the film become undermined. The mole fraction of PEO units in the host copolymer is at least 5% to the host copolymer, preferably 60 to 100%. When the mole fraction of PEO units in the host copolymer is less than 5%, obtained film is hard and ionic conductivity of the film become undermined.

A PEO side chain can be introduced according to the following method. A desired solid state host copolymer is obtained by reacting a monomethylether derivative of PEO in an amount equimolar with a diisocyanate derivative in an aprotic solvent, such as dimethylsulfoxide and the like and further reacting the obtained product with poly(ethylenimine). As an isocyanate derivative, both aromatic isocyanates, such as toluene-2,4-diisocyanate and aliphatic isocyanates, such as hexane-1,6-diisocyanate can be used, said diisocyanates being preferably used in an amount of 0.9 to 1 mole per 1 mole of the PEO, reaction time being preferably 2 to 5 hours, reaction temperature being preferably 20° to 40° C. Further, the amount of poly(ethylenimine) used is preferably 1 to 5 mole to PEO.

A supporting electrolyte mixed with a host copolymer contains at least one substance of the group consisting of alkali metal salts, alkaline earth metal salts, ammonium salts, transition metal salts and solid acids, specifically solid state salts or solid state acids consisting of the anion part and cation part shown below are exemplified: organic acids, such as p-toluenesulfonate, acetate and oxalate and inorganic acids, such as phosphate, perchlorate, thiocyanate, tetrafluoroborate, trifluoromethane sulfonate, hexafluorophosphate, trifluoroacetate, sulfate, halogen atoms, such as fluorine atom, chlorine atom, bromine atom and iodine atom and nitrate are exemplified as the anion part. Alkali metal, such as lithium, sodium, potassium, rubidium, cesium and the like, alkaline earth metal, such as magnesium, calcium, barium, strontium and the like, quaternary ammonium salts, such as ammonium, tetraethylammonium, tetrabutylammonium and the like, proton, transition metal, such as zinc copper and the like are exemplified as the cation part.

The supporting electrolyte is mixed with the host copolymer in an amount of 0.1 to 400 parts by weight, preferably 10 to 100 parts by weight, per 100 parts by weight of the host copolymer. When the amount of supporting electrolyte is not more than 0.1 part by weight, ionic conductivity of the composition become undermined due to decrease of the number of carrier ion. When the amount of supporting electrolyte is more than 400 parts by weight per 100 parts by weight of the host copolymer, the obtained film become hard and ionic conductivity of the film become undermined.

As a process for preparing a solid state and conductive polymer composition, exemplified are the process to dissolve the host copolymer and the supporting electrolyte in a solvent, being capable of dissolving both the supporting electrolyte and the host copolymer, such as acetonitrile, chloroform, methanol, N,N-dimethylformamide, dimethylsulfoxide and the like, followed by casting, or the process to homogenously admix the host copolymer with the supporting electrolyte without solvent, followed by dissolving the supporting electrolyte at temperature fusing the host copolymer.

The solid state and conductive polymer composition obtained by the above method has, detailedly shown in one of the following examples, high ionic conductivity($\sigma$), i.e., about $1\times10^{-3}$ to $1\times10^{-8}$ S/cm at room temperature. The value is superior compared to the value of solid electrolyte recently noted at room temperature, the present composition is useful as an electrochemical element such as battery, electrochromic device, condenser, sensor and the like.

The present composition can solve the problems of liquid leakage and of handling the electrolyte on processing and production due to the electrolyte being liquid, and the present invention makes it possible to easily produce the electrochemical element.

Further, the solid composition of the invention has useful qualities, i.e., satisfactory processability of formed film, flexibility and satisfactory adhesion property to electrode at room temperature in addition to high ionic conductivity.

EXAMPLE

Examples and comparative examples, are shown to describe the invention in more detail.

EXAMPLE 1

A example of a synthetic pathway of the present solid state and conductive polymer composition are shown below.

(1) Synthesis of Poly(ethylenimine)

The backbone, i.e., poly(ethylenimine) was synthesized by hydrolizing a poly-N-acetylethylenimine obtained by living polymerization of 2-methyl-2-oxazoline produced by Aldrich Chemical Company (see Macromolecules, 8, 390 (1975)). Specifically, methyl p-toluenesulfonate was used as an initiator of polymerization in an amount 1/30 in a molar ratio to 2-methyl-2-oxazoline, and the reaction mixture was refluxed in acetonitrile for 8 hours under an inert gas atmosphere. Finish of the reaction was determined by gas chromatography. The straight-chain poly(ethylenimine) (the polymerization degree = about 30), i.e., backbone was obtained by preparing water solution of poly-N-acetylethylenimine (average molecular weight = about 1300, the average polymerization degree = about 30) obtained above in a concentration of about 100 g/l, adding sodium hydroxide to the solution in a concentration of 100 g/l and refluxing the mixture overnight.

(2) Synthesis of Solid State and Conductive Polymer Composition

Equimolecular quantity of polyethyleneglycol monomethylether (product of Aldrich Chemical Company; average molecular weight 550; average polymerization degree 11.8) and toluene-2,4-diisocyanate was added in dimethylsulfoxide as a solvent, the reaction mixture being stirred overnight under an inert gas atmosphere at room temperature. Dimethylsulfoxide solution of the desired host copolymer was obtained by removing unreacted toluene-2,4-diisocyanate from the reaction mixture with distillation under reduced pressure, followed by adding dimethylsulfoxide in an amount 10 times as much weight as the residue, adding said poly(ethylenimine) (polymerization degree = about 30) in an equimolecular amount of the polyethylenglycol monomethylether, and refluxing the mixture overnight. A host copolymer was obtained by removing dimethylsulfoxide from the solution with distillation under reduced pressure, dissolving the residue in acetonitrile and reprecipitating the mixture with diethylether. The result of elemental analysis shows that the host copolymer has the mole fraction of PEO units in the copolymer of 64%. The desired solid state and conductive polymer composition was prepared by casting with the addition of lithium perchlo to the host copolymer until the concentration of lithium perchlorate reaching 18.6% by weight in the composition and drying the composition for 2 days at room temperature and for further 2 days at 50° C. in vacuum.

(3) Determination of the Physical Property Values of the Solid State and Conductive Polymer Composition As a physical characteristics of the solid state and conductive polymer composition thus obtained, glass transition temperature and ionic conductivity($\sigma$) were determined. Glass transition temperature was −42.3° C. determined with DSC 202 (product of Seiko Electronics Industry Company Limited).

Ionic conductivity ($\sigma$) was evaluated by Cole-Cole Plot obtained by determining complex impedance in the range of 10 Hz to 1 MHz with Solartron 1260 IMPEDANCE/GAIN-PHASE ANALYZER. Temperature dependence of ionic conductivity is shown in Table 1.

TABLE 1

| temperature (°C.) | 1000/T ($10^{-3}$ K$^{-1}$) | $\sigma$ (S/cm) | Log($\sigma$(S/cm)) |
|---|---|---|---|
| 80.0 | 2.83 | $1.1E^{-2}$ | −2.0 |
| 70.0 | 2.92 | $6.0E^{-3}$ | −2.2 |
| 61.5 | 2.99 | $3.0E^{-3}$ | −2.5 |
| 50.0 | 3.10 | $1.4E^{-3}$ | −2.9 |
| 41.0 | 3.19 | $5.6E^{-4}$ | −3.3 |
| 31.0 | 3.29 | $2.0E^{-4}$ | −3.7 |
| 25.0 | 3.36 | $1.1E^{-4}$ | −4.0 |
| 8.0 | 3.56 | $1.2E^{-5}$ | −4.9 |
| 3.6 | 3.62 | $5.6E^{-6}$ | −5.3 |
| 2.7 | 3.63 | $4.8E^{-6}$ | −5.3 |

Table 1 shows that the composition of the invention has high ion conductivity, i.e., $1\times10^{-4}$ S/cm at room temperature.

EXAMPLE 2

Glass transition temperature and ionic conductivity of the host copolymer prepared in example I were determined with change of the amount of lithium perchlorate admixed, i.e., salt concentration (% by weight) up and down. The result is shown in table 2 with the result of example 1 (salt concentration: 18.6% by weight).

TABLE 2

| Lithium perchlorate content and physical property values | | | |
|---|---|---|---|
| salt concentration (wt %) | 22.9 | 18.6 | 14.9 |
| Ionic conductivity (S/cm) | $1\times10^{-5}$ | $1\times10^{-4}$ | $1\times10^{-5}$ |
| Glass transition temperature(°C.) | −34.4 | −42.3 | −44.1 |

EXAMPLE 3

To determine the influence of molecular weight of a side chain, the backbones, i.e., polymerization degree = 30, 50 and 100 of ethylenimine was obtained according to the method of example 1 except that the amount of methyl p-toluene sulfonate used was altered at 1/30, 1/50 and 1/100 in a molar ratio to 2-methyl-2-oxazoline, and the poly-N-acetylethylenimines (polymerization degree = 30, 50 and 100) obtained were hydrolyzed in the same manner as example 1. As a side chain, two kinds of polyethyleneglycol monomethylether (product of Aldrich Chemical Company; average molecular weight 550, average polymerization degree 11.8; and average molecular weight 350, average polymerization degree 7.2) were reacted with the three kinds of the backbone respectively. The following Table 3 shows 6 kinds of obtained host copolymer I to VI.

TABLE 3

Kinds of host copolymer using 2,4-diisocyanic acid tolyene

| PEG | PEI $\overline{MW}$ = 1300 | $\overline{MW}$ = 2200 | $\overline{MW}$ = 4300 |
|---|---|---|---|
| $\overline{MW}$ = 350 | I | III | V |
| $\overline{MW}$ = 550 | II*) | IV | VI |

*)host copolymer prepared in example 1

Solid state and conductive polymer compositions were obtained by adding lithium perchlorate in an amount of 19% by weight to the 6 kinds of host copolymer and casting the dissolved mixture from acetonitrile. Ionic conductivity of the compositions were determined, the result being shown in table 4 below with mole fraction of PEO units in the copolymer.

TABLE 4

| host copolymer | I | II | III | IV | V | VI |
|---|---|---|---|---|---|---|
| mole fraction of PEO units in the copolymer (X %) | 72 | 64 | 65 | 62 | 63 | 59 |
| ionic conductivity (S/cm) | $5E^{-4}$ | $1E^{-4}$ | $1E^{-4}$ | $5E^{-5}$ | $1E^{-4}$ | $3E^{-5}$ |

EXAMPLE 4

Solid state and conductive polymer composition was obtained as shown in example 3 except that film casting was conducted in dimethylsulfoxide in place of acetonitrile when 19% by weight of lithium perchlorate was admixed. Ionic conductivity of the obtain composition was $1 \times 10^{-3}$ S/cm.

EXAMPLE 5

Solid state and conductive polymer compositions were prepared as shown in example 3 except that solid acid, i.e., p-toluenesulfonic acid or ortho-phosphoric acid was used in place of lithium perchlorate as an admixed salt. Mixing of solid acid was conducted by grinding and admixing the host copolymer in agate mortar with the solid acid and then drying the mixture overnight at 70° C. under vacuum. The compositions containing solid acid absorb moisture on standing in contact with air for one day, and ionic conductivity of the compositions after standing became higher than the compositions before standing.

Table 5 below shows ionic conductivity of the compositions soon after drying under vacuum and after standing for 1 day in contact with air at room temperature.

TABLE 5

| solid acid | p-toluenesulfonic acid | ortho-H3PO4 |
|---|---|---|
| acid concentration (wt %) | 31 | 61 | 45 |
| ionic conductivity soon after drying (S/cm) | $1E^{-8}$ | $1E^{-6}$ | $1E^{-5}$ |
| ionic conductivity after standing in air (S/cm) | $1E^{-5}$ | $1E^{-4}$ | — |

EXAMPLE 6

Solid state and conductive polymer compositions were prepared as shown in example 3 except that bivalent transition metal salts, i.e., zinc chloride and zinc sulfate were used as a salt admixed in place of lithium perchlorate. Mixing of the host copolymer obtained in example 1 and the transition metal salt was conducted by grinding the mixture and then drying the composition at 70° C. under vacuum overnight. The values of ionic conductivity of the composition obtained are shown in table 6 below.

TABLE 6

| salt | zinc sulfate | | | zinc chloride | |
|---|---|---|---|---|---|
| salt concentration (wt %) | 56 | 39 | 24 | 53 | 23 |
| ionic conductivity (S/cm) | $5E^{-8}$ | $3E^{-8}$ | $1E^{-8}$ | $1E^{-7}$ | $1E^{-8}$ |

EXAMPLE 7

In the process for preparing the host copolymer of example 1, host copolymer of low addition rate of side chain was synthesized as shown in example 1 except that the reaction time was shortened to introduce the PEO side chain, and that the desired support was separated from the composition of high addition rate by utilizing solubility in dimethylsulfoxide. Four kinds of solid state and conductive polymer compositions were prepared by admixing the obtained host copolymer with a 19% by weight of lithium perchlorate respectively and casting of the mixture after dissolving the mixture in acetonitrile or dimethylsulfoxide respectively. Ionic conductivity of the compositions were determined. The result is shown in table 7 below comparing with the result of example 3.

TABLE 7

| host copolymer | II*) | | V*) |
|---|---|---|---|
| mole fraction of PEO units in the copolymer (X %) | 21 | 33 | 29 |
| ionic conductivity obtained by casting from acetonitrile (S/cm) | $1E^{-8}$ | $1E^{-5}$ | $1E^{-5}$ |
| ionic conductivity obtained by casting from DMSO (S/cm) | $1E^{-7}$ | $5E^{-5}$ | $1E^{-6}$ |

*)same mark as shown in example 3

EXAMPLE 8

The host copolymer was obtained as shown in example 1 except that hexane-1,6-diisocyanate was used in place of toluene-2,4-diisocyanate. The desired solid state and conductive polymer composition was obtained by adding a 20% by weight of lithium perchlorate to the host copolymer thus obtained and casting of the mixture after dissolved in dimethylsulfoxide. Ionic conductivity of the composition of room temperature was $1 \times 10^{-7}$ S/cm.

EXAMPLE 9

The present compositions were obtained according to the method for preparing solid state and conductive polymer composition as shown in example 1 except that supporting electrolytes shown in table 8 below were used in place of lithium perchlorate. The amount of the supporting electrolyte used was about 20% by weight respectively. Ionic conductivity of the composition obtained were shown in table 8 below.

TABLE 8

| supporting electrolyte | ionic conductivity (S/cm) |
| --- | --- |
| sodium acetate | $2 \times 10^{-8}$ |
| sodium oxalate | $2 \times 10^{-8}$ |
| sodium thiocyanate | $3 \times 10^{-5}$ |
| sodium tetrafluoroborate | $5 \times 10^{-5}$ |
| sodium trifluoromethanesulfonate | $8 \times 10^{-6}$ |
| sodium hexafluorophosphate | $7 \times 10^{-6}$ |
| sodium trifluoroacetate | $8 \times 10^{-6}$ |
| sodium sulfate | $5 \times 10^{-7}$ |
| sodium nitrate | $5 \times 10^{-7}$ |
| potassium bromide | $7 \times 10^{-6}$ |
| potassium iodide | $9 \times 10^{-7}$ |
| cecium bromide | $5 \times 10^{-7}$ |
| magnesium chloride | $3 \times 10^{-7}$ |
| calcium nitrate | $8 \times 10^{-8}$ |
| strontium nitrate | $2 \times 10^{-8}$ |
| tetrabutylammonium perchlorate | $8 \times 10^{-6}$ |
| tetraethylammonium perchlorate | $8 \times 10^{-6}$ |
| ammonium sulfate | $5 \times 10^{-7}$ |
| polyvinylsulfonic acid | $5 \times 10^{-6}$ |

We claim:

1. A solid state and conductive polymer composition comprising a host copolymer shown in the general formula:

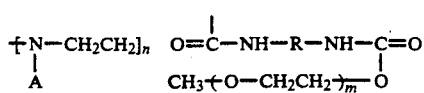

wherein n is an integer in the range of 3 to $1 \times 10^7$, m is an integer in the range of 3 to 100, R is $-C_6H_3(CH_3)-$ or $-(CH_2)_l-$ (l is an integer in the range of 1 to 10), A is hydrogen atom or side chain and wherein said copolymer contains side chains providing a mole fraction of PEO units in the host copolymer of not less than 5% and a supporting electrolyte containing at least one of salts consisting of alkali metal salt, alkaline earth metal salt, ammonium salt, transition metal salt and a solid acid, a supporting electrolyte being admixed in an amount in the range of 0.1 to 400 parts by weight per 100 parts by weight of the host copolymer.

* * * * *